United States Patent [19]
Kurihara

[11] Patent Number: 4,854,434
[45] Date of Patent: * Aug. 8, 1989

[54] HUB CLUTCH

[75] Inventor: Sakuo Kurihara, Tochigi, Japan

[73] Assignee: Tochigi-Fuji Sangyo Kabushiki Kaisha, Tochigi, Japan

[*] Notice: The portion of the term of this patent subsequent to Mar. 14, 2006 has been disclaimed.

[21] Appl. No.: 151,091

[22] Filed: Feb. 1, 1988

[30] Foreign Application Priority Data

Feb. 4, 1987 [JP] Japan .................. 62-15124[U]

[51] Int. Cl.⁴ .................. F16D 11/00; F16D 43/00
[52] U.S. Cl. .................. 192/35; 192/67 R; 192/83; 192/93 A; 192/95; 403/1
[58] Field of Search .................. 192/35, 36, 93 A, 95, 192/83, 67 R

[56] References Cited

U.S. PATENT DOCUMENTS

| | | | |
|---|---|---|---|
| 3,124,377 | 3/1964 | O'Brien et al. | 192/67 R X |
| 3,753,479 | 8/1973 | Wilhoms | 192/89 A |
| 4,007,820 | 2/1977 | Kagota | 192/67 R |
| 4,223,772 | 9/1980 | Telford | 192/48.6 |
| 4,269,294 | 5/1981 | Helbel | 192/54 |
| 4,287,972 | 9/1981 | Petrak | 192/54 |
| 4,438,836 | 3/1984 | Kagota | 192/36 |
| 4,538,714 | 9/1985 | Kagota et al. | 192/36 |
| 4,620,622 | 11/1986 | Onedera et al. | 192/36 |
| 4,621,717 | 11/1986 | Onedera et al. | 192/36 |
| 4,718,527 | 1/1988 | Kurihara | 192/54 |

FOREIGN PATENT DOCUMENTS

0077956 6/1977 Japan .................. 192/67 R

OTHER PUBLICATIONS

U.S. patent application Ser. No. 84,082 Sakuo Kurihara, Hub Clutch, 8/11/87.

*Primary Examiner*—Leslie A. Braun
*Assistant Examiner*—Nicholas Whitelaw
*Attorney, Agent, or Firm*—Wenderoth, Lind & Ponack

[57] ABSTRACT

A hub clutch is operable as an automatic hub clutch and as a manual hub clutch, and includes a hollow housing secured to a wheel hub, the inner circumference of which is provided with a spline, and on the outside end surface of which an opening is defined; a manually operable knob rotatably mounted in the opening of the housing and provided with a boss section having an inclined cam surface; a drive gear fixed to a drive shaft at the extreme end thereof, and provided with a spline and a gear section; a ring clutch supported in an axially transferable manual on the spline and which is engaged with the gear section on the circumference of the drive gear when displaced outwardly in the axial direction; a retainer rotating integrally with the housing and engageable with the cam surface of the knob; a return spring extending between either the retainer and the drive gear or the retainer and the housing for urging the retainer and the ring clutch inwardly in the axial direction; a shift spring extending between the retainer and the ring clutch; and a locking member for restricting the axially inward transfer of the retainer and the ring clutch by receiving the expanding force exerted by the return spring when the meshing of the ring clutch and the drive gear is released.

8 Claims, 10 Drawing Sheets

(a)

(a)

(b)

(c)

(a)

(b)

(a) AUTO
(AUTO POSITION)

(b) M. FREE
(MANUAL FREE POSITION)

(c) LOCK
(AUTO LOCK POSITION MANUAL LOCK POSITION)

(a)

(b)

HUB CLUTCH

FIELD OF THE INVENTION

This invention relates to a hub clutch used in a four-wheel drive vehicle in which engagement of wheels on the driven side with the drive shaft is released when the vehicle is in a two-wheel driving condition.

DESCRIPTION OF THE RELATED ART

As a conventional free wheel hub clutch (hereinafter referred to simply as "hub clutch"), for example, there has been proposed the one disclosed in Japanese Patent Publication No. 60976/1982. The hub clutch disclosed is a manual type in which when a two-wheel driving condition is intended to be changed to a four-wheel driving condition, a four-wheel driving (4WD) selector lever disposed in the driver's seat is set at 4 WD mode after the car is once stopped, and then the driver is required to rotate a knob in the hub clutch disposed at the extreme end of the drive shaft on the wheels on the driven wheel side after the driver gets out of the car. Accordingly, switching over or selecting between the 2 WD and 4 WD conditions has been very complicated in conventional hub clutches.

In view of the above, an automatic hub clutch as disclosed in Japanese Patent Laid-open No. 5482/1984 has been developed. This type of automatic hub clutch has an advantage in that no switching of a knob is required after the driver gets out of the car. However, there have been various disadvantages when this automatic hub clutch is replaced by a manual type hub clutch. More specifically, since there is no mutually common parts between hub clutches of the automatic type and of the manual type, replacing the automatic type with manual type hub clutches is accompanied with an exchange of all of the parts as well as modification of a portion for attaching a hub, so that the replacement is complicated and the cost therefor is inevitably expensive. Namely, since an inventory must be maintained comprising the total number of parts necessary for constructing hub clutches of both manual and automatic types, and as a result of the overhead associated with maintaining an inventory of such parts, complicated exchanging operations, and expensive costs involving such parts have resulted. On one hand, the user's burden for such costs becomes remarkable. Furthermore, in a known automatic hub clutch, the drive shafts rotate in the direction opposite to that along which the drive shaft has just rotated in 4 WD mode when repeating forward and rearward travel during an event such as when escaping from mud. In these circumstances, the transmission of torque is intermittently interrupted as the vehicle alternately assumes a 2 WD condition and a 4 WD condition and therefore rapid escape from the mud becomes difficult. Inthis respect, a manual type hub clutch is superior to an automatic type hub clutch in terms of the reliability thereof.

OBJECTS AND SUMMARY OF THE INVENTION

The present invention has been made in view of the above, and an object thereof is to provide a hub clutch in which the necessary inventory of parts is comparatively small due to the hub clutch employing parts common to both the automatic type hub clutch and the manual type hub clutch.

Another object of the present invention is to provide a hub clutch in which a manual type hub clutch can be modified to an automatic hub clutch by adding only minimally required parts to said manual type hub clutch, and as a result the complicated work of exchanging parts as well as the high costs associated therewith can be suppressed.

Still another object of the present invention is to provide a hub clutch which functions as a manual hub clutch and an automatic hub clutch even after the former hub clutch has been modified to the automatic hub clutch, so that the present hub clutch has the ability to function as a manual type and as an automatic type of hub clutch.

In order to attain the above-described objects, the hub clutch according to the present invention comprises a hollow housing secured to a wheel hub, the inner circumference of which is provided with a spline, and on the outside end surface of which an opening is defined; a manually operable knob mounted rotatably in the opening of said housing and provided with a boss section having an inclined cam surface; a drive gear fixed to a drive shaft at the extreme circumferential end surface thereof, and the circumference of which is provided with a spline and a gear section; a ring clutch supported in an axially transferable manner on the spline on the inner circumference of said housing, and which is engaged with the gear section on the circumference of said drive gear when displaced outwardly in the axial direction; a retainer rotating integrally with said housing, provided with a claw section engageable with the cam surface of said knob, and further provided with a bent section at the axially inward portion thereof; a return spring extending between either the bent section of said retainer and said drive gear or the claw section of said retainer and said housing for urging said retainer and said ring clutch inwardly in the axial direction; a shift spring extending between the bent section of said retainer and said ring clutch for urging said ring clutch outwardly in the axial direction; and a locking member for restricting the axially inward transfer of said retainer and said ring clutch by receiving the expanding force exerted by said return spring when the meshing of said ring clutch with said drive gear is released.

BRIEF DESCRIPTION OF THE DRAWINGS

FIGS. 1(a), (b) and (c), FIGS. 2(a), (b) and (c), and FIGS. 3(a) and (b) illustrate an embodiment of the present invention in which:

FIGS. 1(a), (b) and (c) are sectional views illustrative of free and locked conditions of the hub clutch according to the present invention, respectively;

FIGS. 6(a) and (b) as well as FIGS. 7(a), (b) and (c) illustrating the fourth embodiment of the present invention in which:

FIGS. 6(a) and (b) are longitudinal sectional views showing the hub clutch of the invention in free and locked conditions, respectively;

FIGS. 8(a) and (b) illustrate the fifth embodiment of the present invention wherein FIG. 8(a) is a longitudinal sectional view illustrative of an automatic mode of the hub clutch according to the present invention, and FIG. 8(b) is an explanatory diagram showing a positional relationship between a knob and a boss section.

DETAILED DESCRIPTION OF PREFERRED EMBODIMENTS

The hub clutch according to the present invention will be described in detail hereinbelow.

Figure 1:
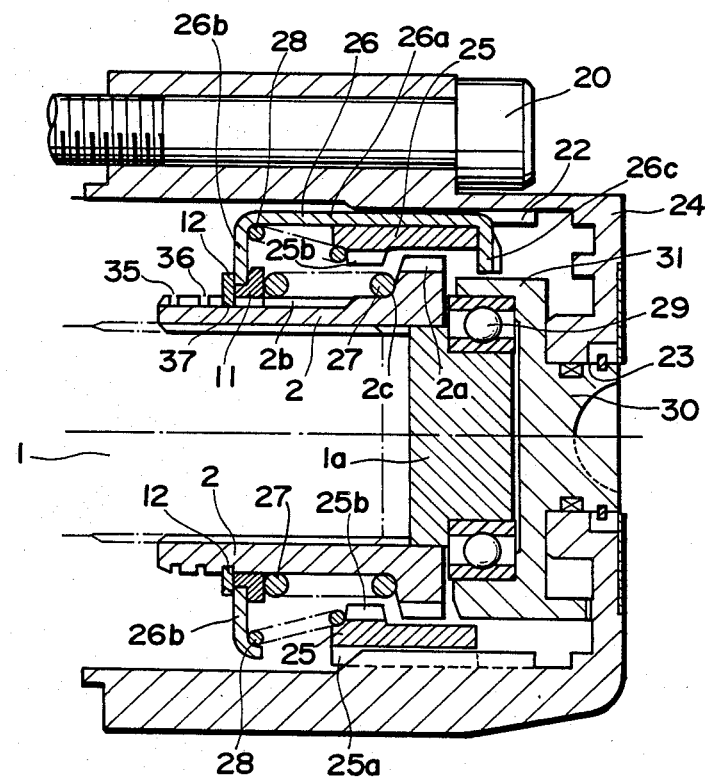
Figure 1B:
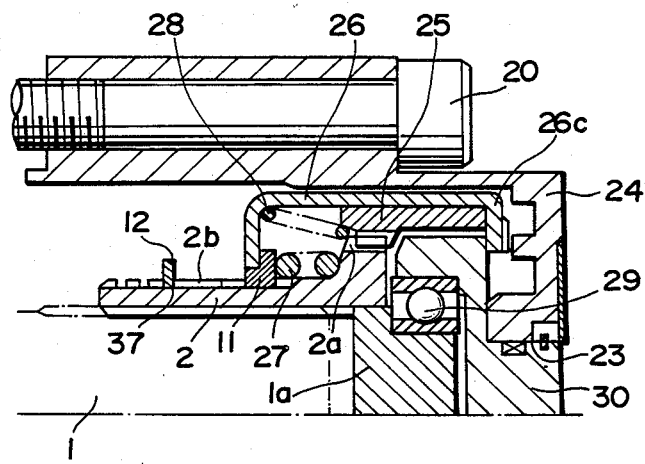
Figure 2:
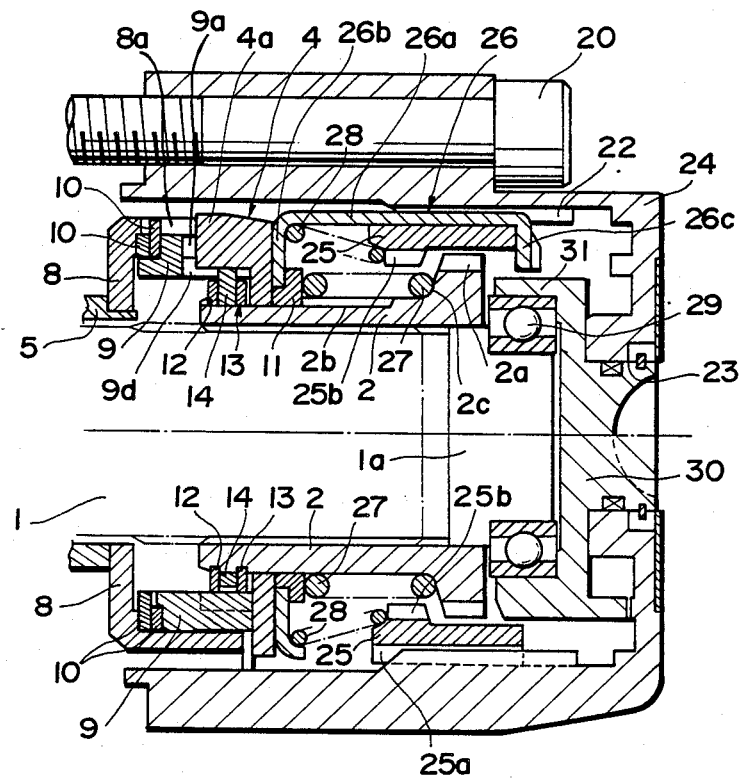
FIGS. 2(a) and (b) are longitudinal sectional views, showing free and locked conditions during automatic travelling of a car, of the hub clutch of the invention provided with an automatic mechanism, respectively.
FIG. 2(c) is a longitudinal sectional view illustrative of a manually locked condition of the hub clutch according to the present invention.
Figure 2:
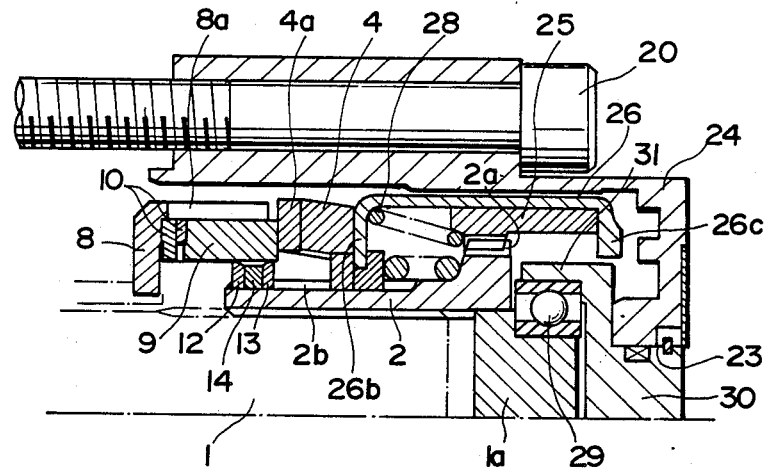
Figure 2:
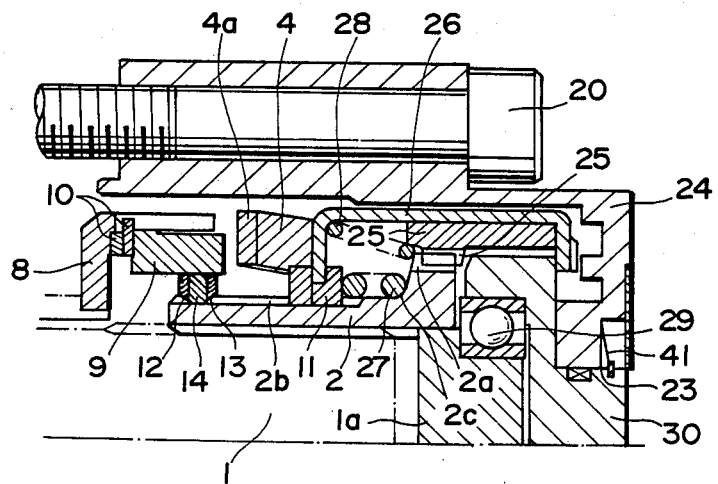
Figure 3:
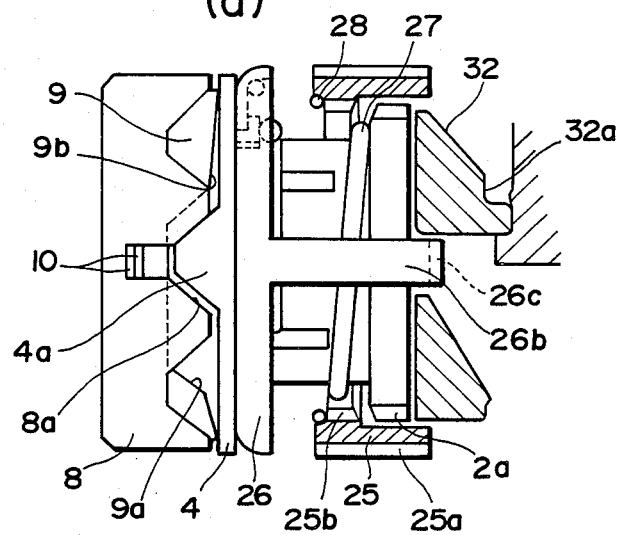
FIGS. 3(a) and (b) are side views, partially in section, showing engaged portions of respective cam sections in free and locked conditions of the automatic hub clutch according to the present invention, respectively.
Figure 3:
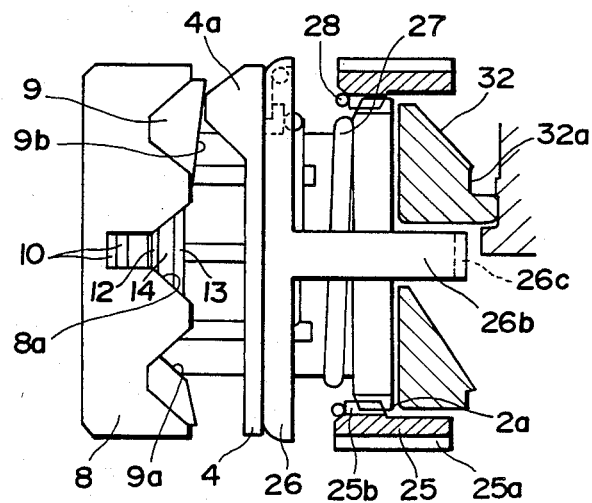

An embodiment of the present invention is illustrated in FIGS. 1(a), (b) and (c), FIGS. 2(a), (b) and (c), and FIGS. 3(a) and (b), respectively, wherein FIGS. 1(a), (b) and (c) illustrate free and locked conditions of the hub clutch of the present invention which is a manually operated hub clutch; FIGS. 2(a) and (b) shown free and locked conditions of the present hub clutch which is an automatic hub clutch, and FIG. 2(c) shows a manually locked state of the present hub clutch which is an automatic hub clutch; and FIGS. 3(a), 3(b) illustrate engaged portions of respective cam sections in free and locked conditions of an automatic hub clutch.

The hub clutch of the present embodiment comprises a drive gear 2 fixedly connected to a drive shaft 1 by means of a spline at the extreme end of the shaft and provided with a gear section 2a and a spline section 2b on the circumference thereof; a housing 24 secured to a wheel hub (not shown) by means of a bolt 20 and having a spline 22 on the inner circumference thereof adjacent and end surface in which is defined an opening 23; a ring clutch 25 provided with a spline 25a engaged with the spline 22 of the housing 24 in an axially transferable manner and a gear section 25b which will engage or disengage the gear section 2a of the drive gear; a retainer 26 provided with a retainer arm 26a the rotation of which is suppressed by the spline 22, a doughnut disk-shaped bent section 26b which extends in the inner diametrical direction inwardly of the retainer arm 26a, and a claw section 26c which is described hereinbelow; an engaging member 11 slidably supported by means of the spline 2b and engaging an end portion of the bent section 26b of the retainer, and the transfer of which in an axially inwardly direction is restricted by means of a circlip 12 functioning as a locking member fitted in a groove 37 defined on the circumference of the drive gear 2; a return spring 27 extending between a stepped section 2c on the circumference of the drive gear 2 and the engaging member 11 to urge said member 11 outwardly in the axial direction (clutch-off direction); and a shift spring 28 extending between the bent section of 26b of the retainer and an inner side wall of the ring clutch 25 to urge said ring clutch 25 inwardly in the axial direction thereof (clutch-on direction). The return spring 27 exerts a stronger spring force than does the shift spring 28. A knob 30 is attached to the housing 24 in the opening 23 thereof so as to be manually rotatable, and a cylindrical boss section 31 is formed on the inside of the knob 30. An extreme end of the drive gear 2 projects from that of the drive shaft 1, and a centering member 1a is secured to the extreme end portion of the drive shaft 1. A bearing 29 is disposed between the centering member 1a and the boss section 31. The outer diametrical section of the bearing 29 is locked by the inner circumferential surface of the boss section 31, while the inner diametrical section is locked by the outer circumferential surface of the centering member 1a.

Figure 1C:
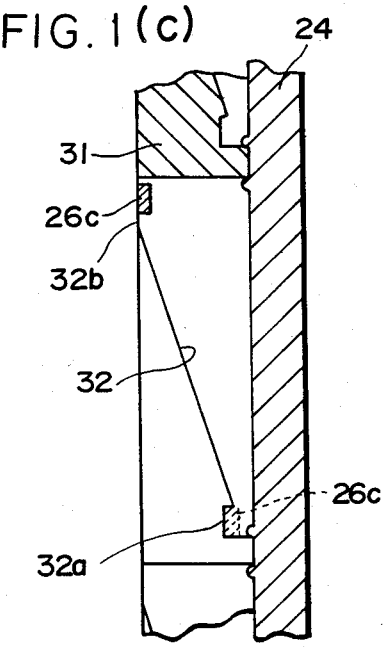

The end portion of the retainer 26 extends in the inner diametrical direction to form the claw section 26c. A cam surface 32 is formed on the circumferential surface of the boss section 31 of the knob 30. The cam surface 32 is a continuously inclined spiral surface extending in the outer axial direction, and the claw section 26c of the retainer 26 is engageable with said cam surface (see FIG. 1(c)). The inner end 32b of the cam surface 32 is open such that the claw section 26c is capable of entering and leaving from said end, and a recess 32a is defined at a lock position at the outer end of the cam surface. When the claw section 26c is disengaged from the cam surface 32 (when the claw section 26c is in the opening 32b in FIG. 1(c)) as a result of the axially inward transfer of the claw section 26c of the retainer 26 from the lock position along the cam surface 32 by revolving the knob 30, the hub clutch of the present embodiment assumes a free condition (FIG. 1(a)). One the other hand, when the claw section 26c is transferred axially outwardly along the cam surface 32 so that the claw section 26c is locked at the lock position (when the claw section 26c is in the lock position in FIG. 1(c)) the present hub clutch assumes a locked condition.

FIGS. 2(a), (b) and (c) illustrate an embodiment wherein the manually operated hub clutch shown in FIGS. 1(a), (b) and (c) is retrofitted with an automatic mechanism, in which a cam member 4 having a V-shaped cam section 4a projecting in the inner axial direction is fitted into a spline 2b of the drive gear 2, by removing the circlip 12 functioning as a locking member from locating groove 37, snapping circlip 13 into a groove 36, fitting a release plate 14 onto the spline 2b, and snapping the circlip 12 into a groove 35. An outer brake 8 is provided with a plurality of V-groove type cam sections 8a into the outer edge of which a thick portion of the cam section 4a on the outer diametrical side of cam member 4 is inserted. An inner brake 9 is provided with a V-groove like first cam section 9a into the outer edge of which a thick portion of the cam section 4a is fitted diametrically inwardly of brake 8 and provided with second cam sections 9b extending from opposite sides of the first cam section 9a, said inner brake 9 producing a required braking force as a result of the sliding engagement of the inside thereof with the outer brake 8 through a friction plate 10 serving as a damping member. The friction plate 10 is disposed between the outer brake 8 and the inner brake 9. The outer brake 8, inner brake 9 and friction plate 10 are integrally assembled with each other. In this case, the release plate 14 is engageable with a projection 9d inside the inner brake 9. The outer brake 8 is connected to a spindle 5 functioning as a stationary system so that said outer brake 8 cannot rotate in the circumferential direction thereof. A locking mode, when the hub clutch is provided with such an automatic mechanism, is effected by the spindle 5 through the cam member 4 and the outer brake 8. The cam member 4, the outer brake 8, the inner brake 9, the friction plate 10, and the release plate 14 are the parts used exclusively for the automatic mechanism for transferring the retainer 26 and the ring clutch 25 when 2 WD mode is reversibly switched over 4 WD mode in an automatic travelling condition. On the other hand, the parts other than those used exclusively for the automatic mechanism such as the retainer 26, the ring clutch 25, the drive gear 2 and the like are commonly employed by both the automatic and manual modes.

In the hub clutch constructed as described above, since the locking member in a manual hub clutch is fitted into a groove 37 for limiting the position of the drive gear 2 and the expanding force of the return spring 27 is received by the circlip 12, the contacting surfaces to which the spring force is applied do not rotate relative to one another, and hence the present hub clutch exhibits excellent durability.

Figure 4:
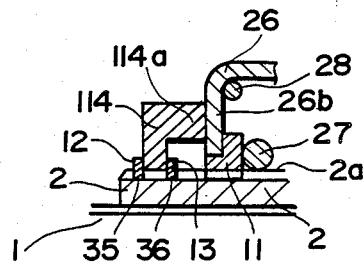
FIGS. 4 and 5 are sectional views illustrating second and third embodiments of the present invention, respectively.

Various means other than those described above may be employed as a means for limiting the transfer of the common parts 11, 26, 25 and the like in the inward axial direction due to the expanding force of the return spring 27. For example, the transfer of the retainer 26 and the like in the axial direction may be limited by utilizing, as is seen in FIG. 4, a locking piece 114 (locking member) having a projection 114a projecting outwardly in the axial direction and disposed at the position at which the release plate 14 would be disposed in an automatic hub clutch or by utilizing a locking plate (locking member) 39 fitted into a groove 38 which is defined on the inner wall of a housing as illustrated in the third embodiment of FIG. 5.

According to these second and third embodiments, it is unnecessary to bore a groove 37 for the circlip 12 on the drive gear 2 at a position at which the cam member 4 is disposed when the hub clutch is provided with an automatic mechanism, so that there is no problem of the cam member 4 being caught by such a groove 37 when positive transfer thereof along the drive gear 2 in the axial direction occurs. Furthermore, if the dimensions of the locking plate 39 in the third embodiment are selected such that the portion of cam member 4 opposite the cam section 4a thereof does not engage the locking plate 39 which abuts against a bent section 26b of the retainer 26, the parts of the automatic hub clutch can be assembled without any rearrangement of the parts of the manually operated hub clutch, e.g. without removing the locking plate 39 from the groove 38, so that the retrofitting work is simple.

Figure 6:
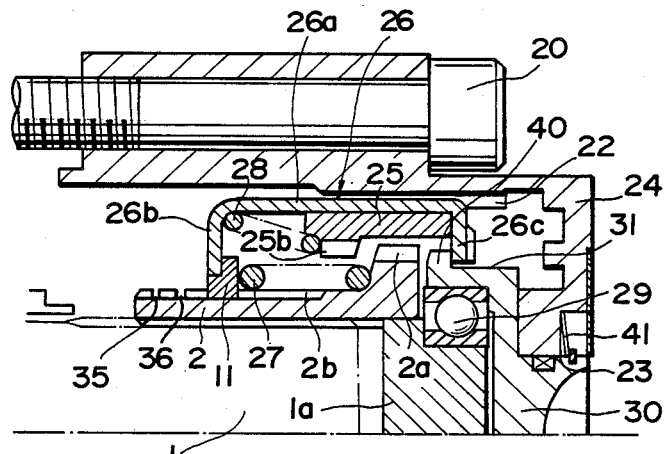
Figure 6:
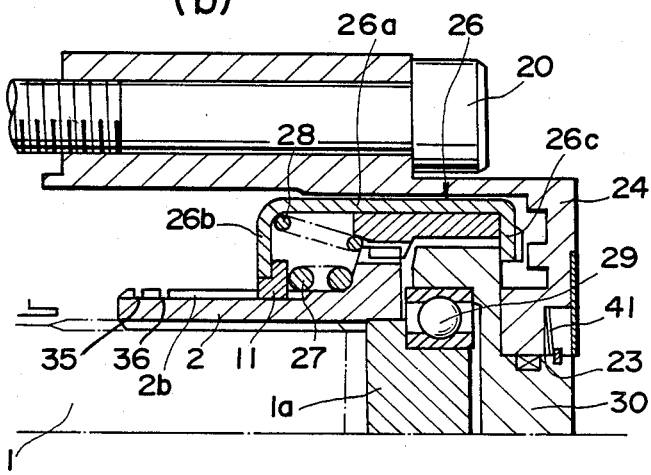
Figure 7:
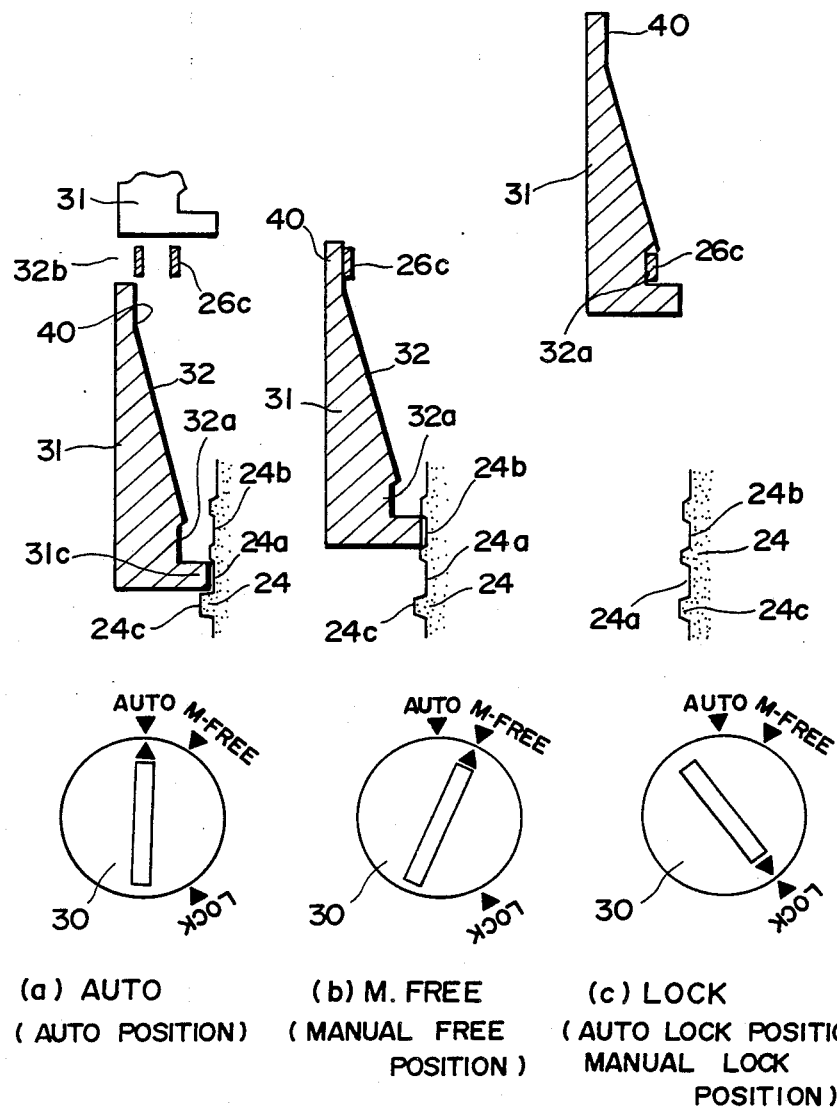
FIGS. 7(a), (b) and (c) are explanatory diagrams illustrating positional relationships between the boss section of a knob and the claw section of a retainer in the respective modes of the hub clutch according to the present invention, respectively.

FIGS. 6(a) and (b) as well as FIGS. 7(a), (b) and (c) illustrate the forth embodiment of the present invention wherein the corresponding parts in the above-described respective embodiments are designated by the same or like reference characters, and the common description thereof will be omitted. The fourth embodiment differs from the above-described respective embodiments in that inward transfer of the claw section 26c of the retainer is limited in the axial direction by a locking piece (locking member) 40 extending from the circumference of a boss section 31 of a knob 30. The locking piece 40 may be formed either by forming it with the boss section 31 or by welding it to said boss section after the formation thereof. The locking piece 40 is flat at a location at which an inner side end portion of the cam surface 32 extends in the axial direction as shown in FIGS. 7(a), (b) and (c). Reference character 41 designates a disc spring for checking the knob 30 (according to a positional relationship between a check section 31c of the boss section 31 and concave portions 24a and 24b of a housing 24). FIGS. 6(a) and (b) illustrate free and locked conditions in a hub clutch according to the fourth embodiment of the present invention, respectively, wherein the locking piece 40 locks the claw section 26c with the check section 31c of the knob 30 positioned at 24b in the free state as shown in FIG. 6(a) and FIG. 7(b) thereby restricting an inward transfer of the claw section in the axial direction, while when the knob 30 is rotated to place the hub clutch in a locked state, a retainer and a slide gear are transferred until claw section 26c is introduced into a recess 32a at an outer lock position in the axial direction as shown in FIG. 6(b) and FIG. 7(c). Furthermore, FIG. 7a) shows a positional relationship between the claw section 26c and cam surface 32 on the circumference of the boss section 31 of the knob 30 when an automatic mechanism is provided. Furthermore, when the automatic mechanism is provided, the check section 31c is positioned at 24a. In these diagrams, FIG. 7(a) illustrates free and locked conditions as in the automatic mode shown in FIGS. 2(a) and (b), and FIG. 7(c) illustrates the same state as the manually locked state shown in FIG. 2(c). In the hub clutch of the present embodiment, since no separate locking piece is provided as a locking member but rather the locking member extends integrally from the cam surface of the boss section 31, assemblage of the automatic mechanism is relatively easy. In the present embodiment, automatic, manually free, and manually locked positions are set by manipulating the knob 30. On the other hand, in the fifth embodiment shown in FIGS. 8(a) and (b), the hub clutch is assembled so that a claw 26c of a retainer is locked onto a locking piece 40 at a position where a check section 31c of a knob 30 is disposed beyond a whirl-stop section 24c extending from a housing 24, and as a result, a knob position used exclusively in a hub clutch having an automatic mechanism is unnecessary. Furthermore, as shown in the sixth embodiment of FIG. 9, a locking piece 40a may be formed by attaching a separate part 40a to the knob 30 in the opening 32b of boss section 31 by means of welding or the like. In comparison with said fourth embodiment, there is no automatically operated position in the fifth and the sixth embodiments, so that there is no possibility of the need to disassemble the hub clutch due to erroneous operation of the mechanism. It is to be noted that a sectional view of the sixth embodiment is identical to FIG. 8(a).

The operation of the present invention will now be described hereinbelow.

Figure 8:
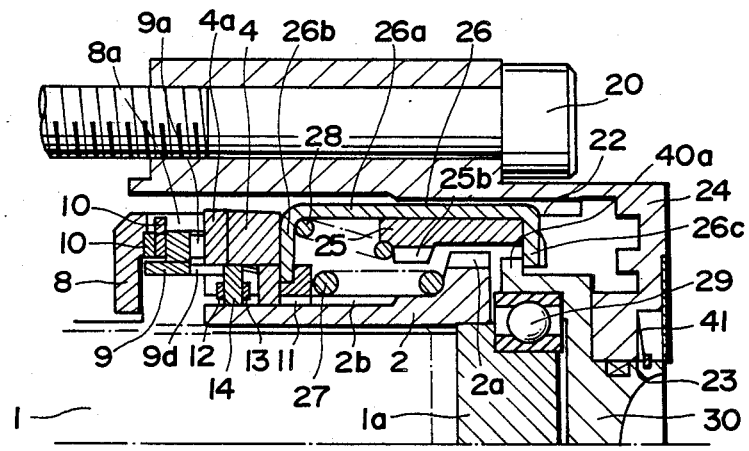
Figure 8:
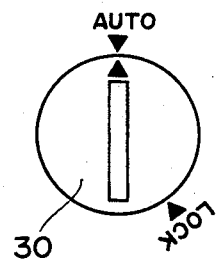
Figure 9:
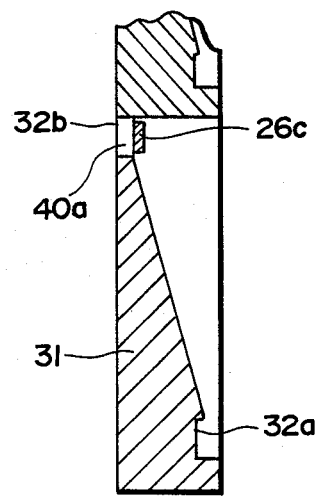
FIG. 9 is a fragmentary sectional view showing a positional relationship between the boss section of a knob and the claw section of a retainer in the sixth embodiment of the present invention.

First, the switching of the clutch-off (free) state shown in FIG. 2(a), FIG. 3(a) and FIG. 8(a) to the clutch-on state shown in FIG. 2(b) and FIG. 3(b) can begin when the hub clutch is in the automatic condition illustrated in FIGS. 2(a), (b), FIGS. 3(a), (b) and FIG. 8(a) in which the claw section 26c of the retainer 26 has been transferred along the cam surface 32 inwardly in the axial direction by revolving the knob 30 until the claw section 26c has been disengaged with the cam surface 32. First of all, when a driving force from an engine is transmitted to the drive shaft 1, the drive gear 2 begins to rotate integrally with the cam member 4. Since the cam section 4a of the cam member 4 is disposed in and engaged with the grooved cam section 8a of the outer brake 8 as well as the first cam section 9a of the inner brake 9 in the clutch-off condition, when the cam member 4 begins to rotate by means of the rotation of the drive shaft 1, the cam section 4a is displaced axially outwardly by means of thrust force which is generated at the respective cam surface and moves towards the outside in the axial direction along the respective cam surfaces of the respective cam sections 8a and 9a. In this case, since the cam member 4 urges the inner brake 9 inwardly in the axial direction, the inner brake 9 forces the friction plate 10 into pressure contact with the inner brake 9 and the outer brake 8 thereby braking the mechanism. The cam section 4a rises over the grooved cam sections 8a and 9a, then runs on the second cam section 9b of the inner brake 9, and is displaced outwardly in the axial direction along said second cam section 9b. The return spring 27 is contracted via the engaging member 11 by the axial transfer of the cam member 4 and at the same time, the clutch ring 25 is displaced outwardly in the axial direction by means of the shift spring 28 whereby the gear section 25b meshes completely with the gear section 2a (FIG. 2(b) and FIG. 3(b)). Thus, when a complete clutch-on state is reached, the release plate 14 positioned on the circumference of the drive gear is engaged with the projection 9d on the inner circumference of the inner brake 9 to directly rotate said inner brake thereby transmitting the rotational torque thereto from drive shaft 1.

Next, when a four-wheel drive condition is switched to a two-wheel drive condition, the car body is moved slightly in the direction opposite to that along which the car body has just moved after transmission of the driving force to the drive shaft 1 is cut off, and the cam section 4a of the cam member 4 is displaced along the cam section 9b in the inwardly axial direction by the force exerted by the return spring 27, and said cam section drops into the cam section 8a of the outer brake 8 and the cam section 9a of the inner brake 9. Thus, the clutch-off state is realized. In the course of inward displacement of the cam member 4 in the axial direction, the gear section 25b of the ring clutch 25 is freed from meshing with the gear section 2a.

Then, when the claw section 26c of the retainer 26 is moved to the lock position 32 as a result of the outward transfer of said claw section 26c along the cam surface 32 by revolving the knob 30, a manually locked state is attained (see FIG. 2(c)). In this manually locked state, since the drive gear 2 is in a regularly complete connecting state with the slide gear 25, no disengagement of the gear section 2a and the gear section 25b occurs even if forward movement and rearward movement of the car body are repeated. For this reason, the spline section does not wear due to ratcheting which occurs during the meshing of the gear section 2a with the gear section 25b. Accordingly, a perfect four-wheel driving state can be maintained, even when escaping from a muddy place or starting down a steep slope or the like. In other words, automatic four-wheel driving or manual complete four-wheel driving can be selected depending upon the road conditions. For example, if wheels are sunk in deep mud, when it is desired to escape from the mud, while the car body is traveling forwardly and rearwardly, the gear section 2a is released from meshing with the gear section 25b during each forward and rearward movement when in automatic four-wheel drive, so that instances occur in which driving force is not transmitted to the wheels whereby rapid escape from such a muddy place becomes difficult. However, if the knob 30 is set at a manually locked state, the problem described above does not occurs.

Since the operation of a manual hub clutch is similar to the manually locked operating condition in a hub clutch provided with said automatic mechanism, the detailed explanation thereof will be omitted.

As described above, the hub clutch according to the present invention has such an advantage in addition to those described in the above respective embodiments in that even if a user initially purchases a car provided with a manual hub clutch, thereafter such a hub clutch can be modified to an automatic hub clutch by retrofitting the former hub clutch with additional parts.

Figure 5:
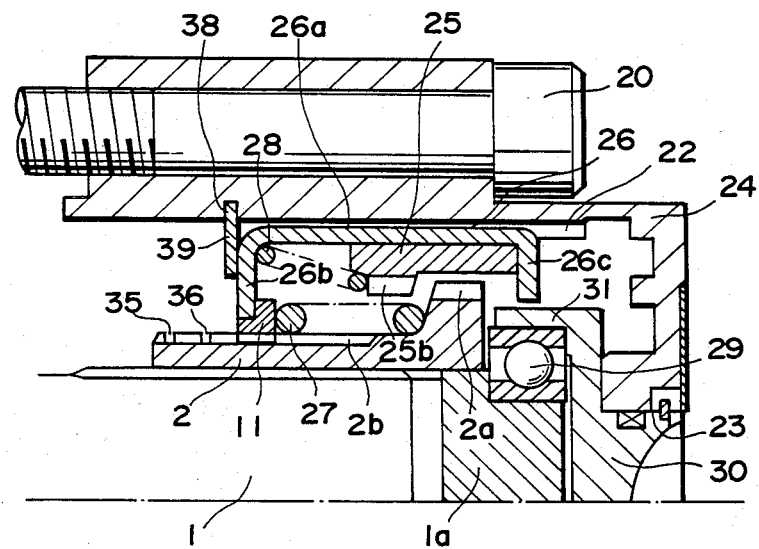

When the hub clutch of the present invention has been purchased with an automatic mechanism, even if the parts used exclusively for the automatic mechanism become impossible to use because of seizure or because of other reasons, the hub clutch can be used as a manual hub clutch by modifying the hub clutch by limiting the axial transfer of the retainer 26 with the provision of a locking member as shown in FIGS. 1(a), (b), FIG. 4, FIG. 5, and FIGS. 6(a), (b) after removing the parts used exclusively for the automatic mechanism. Since the hub clutch according to the present invention comprises only parts used exclusively for the automatic mechanism and parts common to the automatic and manual mechanisms, only minimal work such as changing the positions of common parts and removing the parts used exclusively for the automatic mechanism is necessary when the hub clutch of the invention is modified to a manual mechanism. Accordingly, complicated work associated with considerable reconstruction as in a conventional hub clutch is obviated. For the reason, makers or dealers do not have to keep an inventory of different parts comprising both the types of hub clutch so that controlling inventory is simple and overhead costs are reduced. On the other hand, users also benefit in that their costs become lower.

As described above, since a locking member for restricting the transfer of a retainer and a slide gear in the inward axial direction is provided in accordance with the hub clutch of the present invention, parts for an automatic hub clutch can be commonly used in a manual hub clutch, and a hub clutch having automatic functions can be attained by adding only minimally required parts used exclusively for an automatic mechanism to a manual type hub clutch providing such a hub clutch with automatic mechanism. Therefore a desired reconstruction of a hub clutch can be rapidly attained by simple operations, and a reduction in the costs associated therewith can be realized.

We claim:

1. A hub clutch for selectively transmitting torque between a drive shaft extending in an axial direction and a wheel hub, said hub clutch comprising:
   a hollow housing fixed to the wheel hub so as to rotate therewith;
   said housing having an inner peripheral surface, and outer end, a spline extending along said inner peripheral surface, and an opening extending through said outer end;
   a manually operable knob rotatably mounted to a casing in the opening extending therethrough, said knob having a boss section extending in said casing, said boss section defining a cam surface;
   a drive gear secured to the drive shaft at an end thereof, said drive gear having both a gear section and a spline extending on the outer periphery thereof;

a clutch ring in splined engagement with the spline of said housing so as to be movable along the inner peripheral surface of said housing in the axial direction between a clutch-off position at which said clutch ring is out of engagement with said drive gear and a clutch-on position at which said clutch ring engages said drive gear at the gear section thereof, said clutch-off position located inwardly of said clutch-off position in the hub clutch with respect to the axial direction;

a retainer mounted to said housing for rotating therewith, said retainer slidable in the axial direction relative to said housing and operatively connected to said clutch ring so that said clutch ring moves in the axial direction with said retainer, and said retainer having a claw section engageable with the cam surface of said knob, and a bent section disposed inwardly of said claw section in the hub clutch with respect to the axial direction;

a return spring extending between either the bent section of said retainer and said drive gear or between the claw section of said retainer and said housing for urging said retainer inwardly in the hub clutch in the axial direction;

a shift spring extending between the bent section of said retainer and said clutch ring; and a locking member for limiting inward axial movement of said retainer in the hub clutch, said locking member bearing the urging force exerted by said return spring when said clutch ring is in the clutch-off position thereof.

2. A hub clutch as claimed in claim 1, wherein said locking member is disposed on the outer periphery of said drive gear.

3. A hub clutch as claimed in claim 1, wherein said drive gear has a groove defined in the outer periphery thereof, and said locking member is secured to said drive gear in the groove thereof, said retainer abutting said locking member while said retainer is subject to the urging force exerted by said return spring.

4. A hub clutch as claimed in claim 1, wherein said housing has a groove defined in the inner peripheral surface thereof, and said locking member is secured to said housing in the groove thereof.

5. A hub clutch as claimed in claim 1, wherein said locking member is disposed at an inward end of the cam surface defined by the boss section of said knob.

6. A hub clutch as claimed in claim 7, wherein said locking member is disposed at an inward end of the cam surface defined by the boss section of said knob.

7. A hub clutch for selectively transmitting torque between a drive shaft extending in an axial direction and a wheel hub, said hub clutch comprising:

a hollow housing fixed to the wheel hub so as to rotate therewith;

said housing having an inner peripheral surface, an outer end, a spline extending along said inner peripheral surface, and an opening extending through said outer end;

a manually operable knob rotatably mounted to a casing in the opening extending therethrough, said knob having a boss section extending in said casing, said boss section defining a cam surface;

a drive gear secured to the drive shaft at an end thereof, said drive gear having both a gear section and a spline extending on the outer periphery thereof;

a cam member in splined engagement with the spline of said drive gear so as to be movable along said drive gear in the axial direction, said cam member having a cam section projecting inwardly in the hub clutch;

an outer brake having a grooved cam section engageable with the cam section of said cam member;

a stationary system connected to said outer brake for preventing said outer brake from rotating;

an inner brake disposed diametrically inwardly of said outer brake, said inner brake having a grooved first cam section engageable with the cam section of said cam member, second cam sections each of which is disposed at a respective one of opposite sides of said grooved first cam section, and a projection;

a damping member extending between said inner brake and said outer brake for inhibiting the rotation of said inner brake relative to said outer brake;

a release plate secured to said drive gear at the circumference thereof and engageable with the projection of said inner brake;

a clutch ring in splined engagement with the spline of said housing so as to be movable along the inner peripheral surface of said housing in the axial direction between a clutch-off position at which said clutch ring is out of engagement with said drive gear and a clutch-on position at which said clutch ring engages said drive gear at the gear section thereof, said clutch-off position located inwardly of said clutch-off position in the hub clutch with respect to the axial direction;

a retainer mounted to said housing for rotating therewith, said retainer slidable in the axial direction relative to said housing and operatively connected to said clutch ring so that said clutch ring moves in the axial direction with said retainer, and said retainer having a claw section engageable with the cam surface of said knob, and a bent section disposed inwardly of said claw section in the hub clutch with respect to the axial direction;

a return spring extending between either the bent section of said retainer and said drive gear or between the claw section of said retainer and said housing for urging said retainer inwardly in the hub clutch in the axial direction;

a shift spring extending between the bent section of said retainer and said clutch ring; and a locking member for limiting inward axial movement of said retainer in the hub clutch, said locking member bearing the urging force exerted by said return spring when said clutch ring is in the clutch-off position thereof.

8. A hub clutch as claimed in claim 7, wherein said housing has a groove defined in the inner peripheral surface thereof, and said locking member is secured to said housing in the groove thereof.

* * * * *

UNITED STATES PATENT AND TRADEMARK OFFICE
CERTIFICATE OF CORRECTION

PATENT NO. : 4,854,434

DATED : August 8, 1989

INVENTOR(S) : Sakuo Kurihara

It is certified that error appears in the above-identified patent and that said Letters Patent is hereby corrected as shown below:

Column 8, line 59 (claim 1, line 6) "and" has been changed to --an--;

line 63 (claim 1, line 10) "a" has been changed to --said--;

line 64 (claim 1, line 11) "casing" has been changed to --housing--;

Column 10, line 1 (claim 7, line 10) "a" has been changed to --said--;

line 2 (claim 7, line 11) "casing" has been changed to --housing--;

Signed and Sealed this

Fourth Day of June, 1991

Attest:

HARRY F. MANBECK, JR.

Attesting Officer     Commissioner of Patents and Trademarks